2,973,428

ARC WELDING OF UNALLOYED STRUCTURAL STEEL WORKPIECES SUCH AS HULL-PLATES, AND ARC WELDING ELECTRODES THEREFOR

Claes Fredrik Hakan Pfeiffer, Goteborg, Sweden, and Veikko Olavi Valanti, Helsinki, Finland, assignors to Elektriska Svetsningsaktiebolaget, Goteborg, Sweden, a corporation of Sweden No Drawing. Filed Dec. 1, 1958, Ser. No. 777,207

3 Claims. (Cl. 219—137)

This invention relates to electric arc welding and especially to the welding of ship hulls or other steel structures subjected to immersion in sea water.

Among the various type of electrodes which may be employed for the welding of the joints between ship hull plates, the lime-fluoride coated electrodes have gained a wide popularity on account of their suitability for out-of-horizontal welding as well as on account of the excellent mechanical properties of the welds produced. Cases have been reported, however, in which hull plate welds produced with basic-coated electrodes have been subjected to severe corrosion of a kind not observed in welds made with other electrode types. Investigations have disclosed the facts that the joints attacked by this kind of corrosion were always situated below the water-line, and that the protective paint had been destroyed or removed not only from the welds but also from the adjoining plates. Particularly bad cases of corrosion have occurred in ice-breakers. The swift progress of the corrosion in said cases is explained by the fact that the protective paint is scraped away and the welds continually kept clean of corrosion products by the action of the ice.

It is an object of the invention to provide an improved structural steel welding process in which lime-fluoride coated electrodes are used but the resulting weids are substantially proof against abnormal corrosion in sea water. It is also an object of the invention to provide improved welding electrodes of the lime-fluoride type adapted to provide a substantially unalloyed steel weld deposit not liable to preferential attack in sea water. Another object is the provision of lime-fluoride coated welding electrodes which, while having the new property just indicated, still retain their general usefulness and may be generally employed in the same fields as ordinary unalloyed steel lime-fluoride coated electrodes.

Other objects and features of the invention will be apparent from the following specification and the claims.

The improved process according to the invention is applicable to the welding of joints between unalloyed structural steel workpieces subjected in use to immersion in sea water. The steels here designated as unalloyed structural steels should be understood to comprise not only plain low carbon steels, but also steels containing moderate proportions of silicon and manganese, for instance up to 0.7% silicon and up to 1.5% manganese, added as deoxidizing agents or for the purpose of adjusting the tensile strength of the steel. In most cases, the contents of carbon, silicon and manganese in ship hull steels do not exceed the following percentages: C 0.25%, Si 0.30%, Mn 0.90%. According to a basic feature of the process according to the invention, the joints are welded with lime-fluoride coated electrodes so composed as to produce a low carbon unalloyed steel weld deposit containing additions of at least one metal soluble in ferrite and having a lower (less negative) electrolytical potential than iron, the addition of said metal being so adjusted that the electrolytical potential of the weld deposit in sea water is approximately equal to or slightly less negative than the potential of the workpiece material.

In this connection, lime-fluoride coated electrodes should be understood to comprise any coated electrodes in which the slag-forming constituents of the coating substantially consist of limestone (which may be wholly or partly replaced by other alkaline earth carbonates, for instance dolomite) and fluorspar (which may be wholly or partly replaced by cryolite or similar double fluorides). The expression "low carbon unalloyed steels" should be understood to mean steels which contain not more than 0.25% of carbon, preferably not more than 0.1%, and which may contain, in addition to the special metals to be added according to the invention, silicon and manganese in the proportions usually employed in steel weld deposits for deoxidizing purposes or for adjusting the tensile strength of the steel, for instance 0.7% silicon and 1.5% manganese. The weld deposit may also contain small proportions of other elements sometimes employed in unalloyed steel weld deposits, for instance titanium and aluminum, as well as usual impurities among which chromium in amounts up to 0.1% is to be counted. The total content of metals other than iron, copper and nickel should not exceed 2.5% by weight.

The preferential corrosion of the welds to which reference has been made above can be explained as an effect of the formation of galvanic elements in which the weld is the negative electrode and the parent material (the plate) is the positive electrode. This kind of corrosion will be completely suppressed in welds produced according to the invention. Owing to the fact that different classes of structural plates, and even different consignments of plates of one class, will rarely have the same potential, it will be difficult to carry out the process according to the invention in such a manner as to make the potential of the weld deposit exactly similar to the one of the surrounding plates. However, no such exact adjustment of the weld deposit potential will be required, as the intended object will be realized just as well by displacing the weld deposit potential in the positive direction by an amount sufficient to make the weld deposit constitute the positive electrode of the galvanic elements formed with all of the plate materials employed. Under these conditions, the galvanic current produced cannot result in any dangerous corrosion, as the current density at the surface of the plates constituting the negative electrode will be too small to produce any corrosive effects. As a practical rule, the composition of the weld deposit should be adjusted so as to result in a potential (in sea water) in the approximate range between the potential of the workpiece material and an upper limit about 5 millivolts less negative than the potential of the workpiece material.

The preferred metals to be added in the process according to the invention are copper and nickel, singly or in combination. While cobalt may be considered an equivalent to nickel, the former metal has no particular advantages to justify its higher price. To produce a substantial reduction of the tendency to corrosive attack on the weld, the proportion of copper plus twice the proportion of nickel present in the weld should amount to not less than 0.4% by weight. Therefore, if copper alone is added, the proportion of copper should be at least 0.4% by weight, while, if nickel alone is added, a proportion of 0.2% by weight will be sufficient.

The welding electrode according to the invention comprises a core of low carbon unalloyed steel and a coating of the lime-fluoride type having such a composition that the electrode will produce a weld deposit of low carbon unalloyed steel. According to the invention, the electrode contains such a proportion of copper and/or nickel that the sum of the copper content and twice the nickel content consitutes at least about 0.4%, preferably not less than 0.6% by weight of the metallic constituents of the electrode. The total content of said metals should not exceed 1.25% by weight of the metallic constituents of the electrode. The metal or metals added may be present as constituents of the metallic core or as constituents of the coating, or as constituents of both. If copper is employed, the core wire may for instance contain 0.2% of copper, while the remainder of the proportion of copper required is added as a constituent of the coating. The copper may be present in the coating in the form of a copper oxide. The welding process will reduce the copper oxide to metallic copper. If copper alone is employed (no nickel or cobalt), a proportion of copper amounting to about 1% by weight of the metallic constituents of the electrode can be recommended as suitable for the majority of practical cases.

While it has not yet been possible to obtain complete clarity concerning the metallurgical factors determining the intensity of the preferential attack on the weld deposit produced with ordinary lime-fluoride coated electrodes, it is believed that the comparatively large proportion of silicon usually present does play an important part. The invention therefore is of particular interest in connection with the usual kind of lime-fluoride coated electrodes in which the coating contains a weight of silicon, usually in the form of ferrosilicon, amounting to not less than 0.5% by weight of the metallic constituents of the electrode.

An example of a welding electrode according to the invention will now be given. The core wire has a diameter of 4 mm. (0.158 in.) and consists of mild carbon steel (C 0.10%). The extruded coating has an outer diameter of 6.3 mm. (0.248 in.) and is composed as follows (exclusive of the potassium silicate binder):

| | Percent by weight |
|---|---|
| Limestone | 24.0 |
| Fluorspar | 21.4 |
| Rutile | 2.6 |
| Hausmannite | 6.8 |
| China clay | 1.7 |
| Iron powder | 33.0 |
| Ferrosilicon | 8.5 |
| Copper powder | 2.0 |
| | 100.0 |

The weld metal deposited with this electrode has a copper content of approximately 0.7%. An all weld metal test bar had a potential of −736 millivolts in sea water at 25° C. against a standard electrode. Test bars made from normal ship plate had under the same conditions potential between −735 and −738 millivolts. All weld metal test bars made with normal, practically copper-free lime-fluoride coated electrodes will assume potentials between −742 and −747 millivolts.

Corrosion tests have been carried out in which welded plate samples were submerged in the sea for extended periods and the corrosion products as well as other contaminations were removed at regular intervals. The welds produced with ordinary, practically copper-free lime-fluoride coated electrodes were preferentially attacked resulting in the formation of a groove the bottom of which was formed by the weld surface and the depth of which increased throughout the immersion period. In contradistinction thereto, the welds made with the welding electrodes according to the present invention exhibited normal rusting only and were not attacked more intensely than the adjoining plate material.

We claim:

1. An arc welding electrode comprising a core of low-carbon unalloyed steel and a coating of the lime-fluoride type, characterized by a content of metal from the group comprising copper, nickel, and cobalt, the total weight of metal from said group not exceeding 1.25% of the weight of all of the metallic constituents of the electrode, and the weight of copper plus twice the combined weight of nickel and cobalt amounting to not less than 0.4% by weight of all of the metallic constituents of the electrode.

2. An arc welding electrode comprising a core of low carbon unalloyed steel and a coating of the lime-fluoride type, said coating comprising a weight of silicon, preferably in the form of ferrosilicon, amounting to not less than 0.5% of the weight of all of the metallic constituents of the electrode, characterized by a content of copper amounting to not less than 0.6% and not more than 1.25% of the weight of all of the metallic constituents of the electrode.

3. In the arc welding of joints between unalloyed structural steel workpieces and subjected in use to immersion in sea water, the step of welding said joints with lime-fluoride coated electrodes producing a low carbon unalloyed steel weld deposit containing additions of at least one metal from the group comprising copper, nickel, and cobalt, the total weight of metal from said group not exceeding 1.25% of the weight of all of the metallic constituents of the electrode, and the weight of copper plus twice the combined weight of nickel and cobalt amounting to not less than 0.4% by weight of all of the metallic constituents of the electrode, the addition of metal from said group giving the electrolytic potential of the weld deposit in sea water a value substantially in the range between the potential of the workpiece material and an upper limit about 5 millivolts less negative than the potential of the workpiece material.

References Cited in the file of this patent

UNITED STATES PATENTS

| 2,704,317 | Hummitzsch et al. | Mar. 15, 1955 |

FOREIGN PATENTS

| 420,277 | Great Britain | Nov. 28, 1934 |
| 553,371 | Great Britain | May 19, 1943 |